Jan. 21, 1958     C. A. PULASKI     2,820,430
FILTER AND OIL CHANGE INDICATOR FOR A LUBRICATING SYSTEM
Filed Feb. 27, 1956
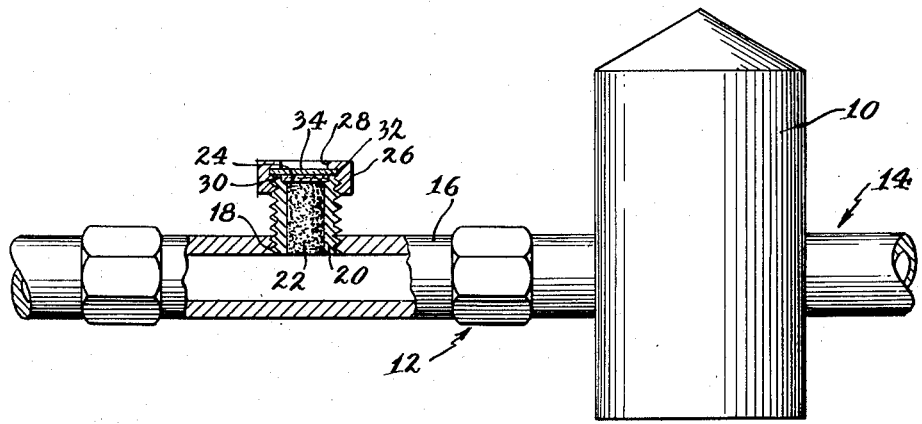
Fig.1
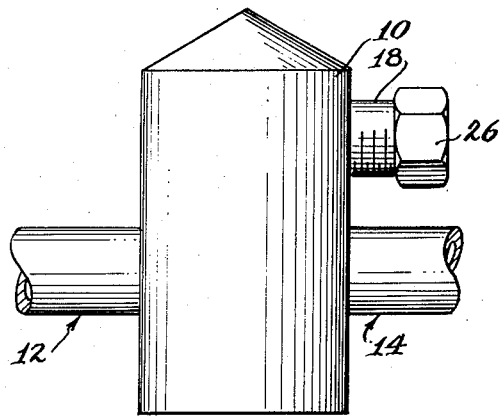
Fig.2
INVENTOR.
Charles A. Pulaski
BY
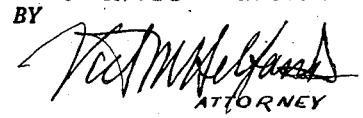
ATTORNEY

United States Patent Office 2,820,430
Patented Jan. 21, 1958

2,820,430

FILTER AND OIL CHANGE INDICATOR FOR A LUBRICATING SYSTEM

Charles A. Pulaski, Port Washington, N. Y.

Application February 27, 1956, Serial No. 567,952

12 Claims. (Cl. 116—114)

The present invention relates to an indicating device or means for use in a pressurized oil circulating system which includes an oil filter, such as a motor lubricating circuit, to indicate and signal the need for changing the oil filter or the oil in the system.

The filter elements in a pressurized lubricating system, such as the motor lubricating system of automobiles and the like, gradually become clogged with impurities picked up by the oil in the course of its circulation through the system and removed from the oil by the filter element to an extent where it becomes ineffective for further removal of impurities, and generally interferes with the circulation of the oil through the lubricating system.

Also, the oil itself, after prolonged use, becomes unsuitable for further effective lubrication and is required to be changed.

Heretofore, changes of filter elements and of oil in pressurized lubricating systems were effected either on the basis of absolute elapsed time from an earlier change, as in the case of stationary motors, or also on the basis of mileage in the case of automotive equipment.

Both of these methods of determining changing time have been found unsatisfactory. One reason for this lack of satisfaction is the frailty of human memory which is apt to forget either the date of the last prior change or the mileage at such last change or to check current mileage. Another reason for the unsatisfactory character of the earlier methods relied on for determining the time for changing a filter element or the oil in a lubricating system is the fact that motors often do not operate during regularly fixed hours each day or at a steady rate or under uniform condition, so that even the time and mileage standards heretofore applied will not show the true condition of the filter element or the oil.

It is an object of the present invention to provide means for indicating the need for changing the filter element or the oil in a pressurized lubricating circuit which depend neither on time nor on mileage, but are more closely directly responsive to the actual condition of the filter element or of the oil as a result of actual time of operation and of conditions of operation of the mechanism in which the lubricating system operates.

It is another object of the present invention to provide an indicator for filter element or oil changing time which includes visible signaling means to apprise the operator of the need for changing such filter element or oil and eliminates dependence on memory.

It is a further object of the present invention to provide a filter element or oil change indicator of the character described which is highly effective and efficient for its purpose; which may be readily and easily installed in any pressurized lubricating circuit and which is relatively economical to install and use.

The foregoing and other objects and advantages of the filter element and oil change indicator for pressurized lubricating systems of the present invention will become more readily apparent to those skilled in the art from the embodiments thereof more or less diagrammatically illustrated in the accompanying drawing and from the description following. It is to be understood, however, that such embodiments are shown by way of illustration only, to make the principles and practice of the invention more readily comprehensible, and without any intent of limiting the invention to the specific details therein shown.

In the drawings:

Fig. 1 is a fragmentary, elevational and partly sectional view of a filter element or oil change indicator installation of the present invention shown as installed in the conduit of a pressurized lubricating oil system; and Fig. 2 is a fragmentary, elevational view showing the indicator installed on the filter housing of the system.

Referring more specifically to the accompanying drawing, there is more or less diagrammatically shown therein a section of pressurized oil lubricating system which includes a pump, not shown, a filter element enclosed within a housing 10, and conduits 12 and 14, leading in and out of the oil filter housing 10. One of the conduits, as 12, may include a section of tubing 16, in which is formed a tapped opening 18 in which is set an externally threaded tube 20 adapted to serve as a housing for a removable and replaceable oil permeable plug 22.

The plug 22 may be formed of any suitable material that is porous or absorbent to oil, but which is compacted to reduce its porosity and to slow down the permeability of oil therethrough. Suitable materials for forming the plug may comprise compacted paper or paper pulp or other cellulosic pulp, or clay or mixtures of the two, or any other compactable material having the same characteristics as paper or paper pulp or clay.

The plug 22 is of substantially the same height as its housing 10 and of a thickness to fit snugly and tightly therewithin to prevent the seepage of oil around it under pressure.

The indicator of the present invention further comprises a section or disc of opaque paper 24, which is colored on one side with a preferably distinct color. This paper disc 24 is placed on top of the outer end of the plug 22 with its colored face against such plug. The paper disc 24 and the plug 22 are held in place by means of a tubular, preferably polygonal, nut-like cap 26 having a central opening 28, which is enlarged at one end 30, and the enlarged end internally threaded. The threaded enlargement 30 engages the threads of the housing 10 and the shoulders 32 formed by the threaded enlargement 30 engaging over the edges of the paper disc 24.

The hollow cap 26 may be provided with a transparent window or pane 34 that will protect the surface of the disc 24 without interfering with the visibility thereof. This pane 34, which may be of glass or transparent plastic, may be held directly above the disc 24 or in spaced relation thereto, as indicated, in any desired manner.

In Fig. 2, I have illustrated an arrangement wherein the indicator, instead of being connected in the oil conduit leading to or from the filter pump, is set into the housing 10 of the filter itself. And it may here be stated that any other location on the lubricating oil circuit may be utilized for installing the indicator; the primary consideration being its ready accessibility and visibility to the person operating the mechanism in which the lubricating system functions.

Having thus described the structure and arrangement of the change indicator, its operation will now become evident. As the mechanism or motor in which the lubricating system is installed operates, the oil pressure set up during the operation will gradually but very slowly cause oil to permeate outwardly through the plug 22. The plug 22 may be pre-formed to be of the desired length or height and of suitable compactness to provide for the oil to penetrate completely therethrough only after a certain length of time of operation of the motor which, by experience, has been found safe to use the motor without changing the filter or the oil, as the case may be.

After the pressurized oil system has been in operation for the predetermined length of time and the oil has completely penetrated through the plug 22, it will then contact the paper disc 24 which, as is the case, generally, of paper coming in contact with oil, will become translucent so that the color on its inner face will become visible therethrough and will serve as notice to the operator of the system that it is time to change the filter or the oil, as the case may be.

This completes the description of the change indicator of the present invention and the manner of its installation and operation. It will be readily apparent that such indicator of the present invention is more accurately responsive to the actual condition of the filter or oil in the system in which it is installed than any indicators heretofore used. It will also be apparent that the filter or oil change indicator relieves reliance on the generally undependable memory of the person or persons in charge of the installation. It will likewise be apparent that the indicator of the present invention is of relatively simple construction, and easy and economical to install in any pressurized lubricating system.

It will be further apparent that numerous variations and modifications of the filter or oil change indicator of the present invention may be made by anyone skilled in the art, in accordance with the principles of the invention hereinabove set forth, and without the use of any inventive ingenuity. I desire, therefore, to be protected from any and all such variations and modifications that may be made within the spirit of the present invention and the scope of the claims hereto appended.

What I claim is:

1. A filter and oil change indicator for an oil circulating lubricating system including conduit portions, comprising an aperture formed in one of said conduit portions, a tubular housing open at each end engaged by one end in said opening, a plug of oil permeable material snugly fitted within said housing, an oil absorbent strip of material rendered translucent by absorbed oil and colored on one side disposed with its colored side against the outer end of said plug within said housing, and means within said housing for retaining said plug and said strip therewithin.

2. The filter and oil change indicator of claim 1, wherein said material forming said plug is compacted to retard the permeability of oil therethrough.

3. The filter and oil change indicator of claim 1, wherein said plug comprises compacted fibrous material.

4. The filter and oil change indicator of claim 1, wherein said plug comprises compacted paper pulp.

5. The filter and oil change indicator of claim 1, wherein said plug comprises compacted cellulosic fibrous material.

6. The filter and oil change indicator of claim 1, wherein said plug comprises compacted granular inert material.

7. The filter and oil change indicator of claim 1, wherein said plug comprises compacted clay.

8. The filter and oil change indicator of claim 1, wherein said plug comprises a compacted mixture of cellulosic fibrous material and inert granular material.

9. The filter and oil change indicator of claim 1, wherein said strip comprises paper.

10. The filter and oil change indicator of claim 1, wherein said means for retaining said plug and said strip comprise a shoulder formed within said housing adjacent its other end.

11. A filter and oil change indicator for an oil circulating lubricating system including a plug of oil permeating material, a strip of opaque oil absorbent material rendered translucent by the absorbed oil, said strip disposed against one end of said plug with its face in contact therewith, and means for holding the other end of said plug in contact with the oil passing through said lubricating system.

12. A filter and oil change indicator for an oil circulating lubricating system including a plug of oil permeating material, a strip of opaque oil absorbent material rendered translucent by the absorbed oil, said strip having one side thereof colored and disposed against one end of said plug with its colored face in contact therewith, means for retaining said plug end and said strip face in contact with one another and means for holding the opposed end of said plug in contact with the oil in said lubricating system.

References Cited in the file of this patent

UNITED STATES PATENTS

| | | |
|---|---|---|
| 1,499,478 | Robinson | July 1, 1924 |
| 2,145,304 | Hill | Jan. 31, 1939 |
| 2,609,692 | Ahlgren | Sept. 9, 1952 |